(12) United States Patent
Petrie et al.

(10) Patent No.: US 7,444,441 B2
(45) Date of Patent: Oct. 28, 2008

(54) DEVICE INCLUDING MEANS FOR TRANSFERRING INFORMATION INDICATING WHETHER OR NOT THE DEVICE SUPPORTS DMA

(75) Inventors: Richard Petrie, Guildford (GB); Jan Gundorf, Koege (DK)

(73) Assignee: Nokia Corporation, Espoo (FI)

( * ) Notice: Subject to any disclaimer, the term of this patent is extended or adjusted under 35 U.S.C. 154(b) by 188 days.

(21) Appl. No.: 10/530,955

(22) PCT Filed: Oct. 1, 2003

(86) PCT No.: PCT/IB03/04365

§ 371 (c)(1),
(2), (4) Date: Oct. 11, 2005

(87) PCT Pub. No.: WO2004/034268

PCT Pub. Date: Apr. 22, 2004

(65) Prior Publication Data

US 2006/0101165 A1    May 11, 2006

(30) Foreign Application Priority Data

Oct. 9, 2002    (GB)    ................................ 0223371.6

(51) Int. Cl.
*G06F 13/28*    (2006.01)

(52) U.S. Cl. .............................. 710/22; 710/23; 710/24; 710/25; 710/26; 710/27; 710/28

(58) Field of Classification Search ....................... None
See application file for complete search history.

(56) References Cited

U.S. PATENT DOCUMENTS

| 5,655,145 | A | | 8/1997 | Chejlava, Jr. et al. ......... 395/821 |
| 5,845,151 | A | * | 12/1998 | Story et al. .................... 710/27 |
| 6,216,183 | B1 | * | 4/2001 | Rawlins ....................... 710/100 |
| 6,298,396 | B1 | * | 10/2001 | Loyer et al. .................... 710/22 |
| 6,598,097 | B1 | | 7/2003 | Daniels et al. ................. 710/22 |
| 6,898,678 | B1 | * | 5/2005 | Six et al. ...................... 711/151 |
| 7,000,035 | B1 | | 2/2006 | Uchizono et al. ............... 710/2 |
| 2001/0049755 | A1 | | 12/2001 | Kagan et al. ................... 710/22 |
| 2002/0052987 | A1 | | 5/2002 | Collier ......................... 710/22 |
| 2004/0036911 | A1 | * | 2/2004 | Saida .......................... 358/1.15 |
| 2004/0103234 | A1 | * | 5/2004 | Zer et al. ...................... 710/301 |

FOREIGN PATENT DOCUMENTS

| JP | 11-88381 | 3/1999 |
| KR | 2001-0075581 | 8/2001 |
| WO | WO 01/96979 A2 | 12/2001 |

* cited by examiner

*Primary Examiner*—Alan Chen
(74) *Attorney, Agent, or Firm*—Harrington & Smith, PC

(57) ABSTRACT

A device for attachment to a host for serial data communication including means for transferring to the host a predetermined data structure indicating whether or not the device supports direct memory access.

22 Claims, 2 Drawing Sheets

DEVICE INCLUDING MEANS FOR TRANSFERRING INFORMATION INDICATING WHETHER OR NOT THE DEVICE SUPPORTS DMA

FIELD OF THE INVENTION

A The present invention relates to a host and a device connected for serial data communication. In particular it relates to the extension of the Universal Serial Bus (USB) Standard "Universal Serial Bus Specification Revision 2.2".

BACKGROUND OF THE INVENTION

The inventors have identified an area in which the current USB Specification could be improved. Currently, when a USB host sends data to a destination in an attached USB device, the device's processor must be interrupted to transfer the data from the buffer in which it is temporarily stored when received to its destination. The USB host can therefore add to the processing load of the attached device. Thus a data transfer may result in the hanging of an application running on the processor or other undesirable affects.

It would be desirable to improve the mechanism by which data is transferred between host and device.

It would be desirable to provide a mechanism by which the host can reduce undesirable consequences in the device resulting from a data transfer.

SUMMARY OF THE INVENTION

According to a first aspect of the invention there is provided a device for attachment to a host for serial data communication comprising: means for transferring to the host a predetermined data structure indicating whether or not the device supports direct memory access.

The means for transferring may be responsive to a request from the host, for example, in USB, the device is polled by the host. The predetermined data structure may be one of a plurality of data structures transferred at one time to the host. These data structures preferably provide the capabilities of the device to the host. The device may be a USB device, the host a USB host and the data structures may be a series of USB descriptors, provided at enumeration of the device. The predetermined data structure may be a non-standard descriptor that extends another, preferably preceding, descriptor.

According to a second aspect of the present invention there is provided a host for attachment to a device for serial data communication comprising:

transfer means for transferring a predetermined data structure identifying whether or not the device supports direct memory access, from the device to the host.

The transfer means may be arranged to request the device to send at least the predetermined data structure, for example, in USB the device is polled by the host. The predetermined data structure may be one of a plurality of data structures transferred at one time to the host These data structures preferably provide the capabilities of the device to the host. The device may be a USB device, the host a USB host and the data structures may be a series of USB descriptors, provided at enumeration of the device. The predetermined data structure may be a non-standard descriptor that extends another, preferably preceding, descriptor. The host may further comprise allocation means for allocating tasks relating to data transfer from/to the device in dependence upon the content of the predetermined data structure.

According to a third aspect of the present invention there is provided a system comprising a host, a device and a serial data interconnect between the host and device, comprising: means for transferring, from the device to the host via the serial data interconnect, a predetermined data structure indicating whether or not the device supports direct memory access.

Embodiments of the invention provide a mechanism by which a host determines whether an attached device supports direct memory access (DMA) for certain functions. With this information, the host can choose whether or not to communicate with an interface/endpoint of the device which supports DMA or with an interface/endpoint of the device which does not support DMA This allows the host flexibility in scheduling the transfer of data across the bus connecting the host and device and allows the host to optimise use of the device. The use by the host of an interface/endpoint which supports DMA, reduces the loading on the device's processor, as processor interrupts are no longer required to transfer the data to its destination. This is particularly advantageous for mobile devices, such as mobile cellular telephones, which may have low power processors that are used to simultaneously run user applications.

In most USB devices, if DMA is supported, it would be supported by both the inbound and the outbound endpoints. In a preferred embodiment, the host determines if an interface supports DMA, it being assumed that if the interface supports DMA then both the inbound and outbound endpoints support DMA. This provides for a simplified implementation of the invention.

BRIEF DESCRIPTION OF THE DRAWINGS

For a better understanding of the present invention and to understand how the same may be brought into effect, reference will now be made by way of example only to the accompanying drawings in which.

DETAILED DESCRIPTION OF THE INVENTION

Figure 1:
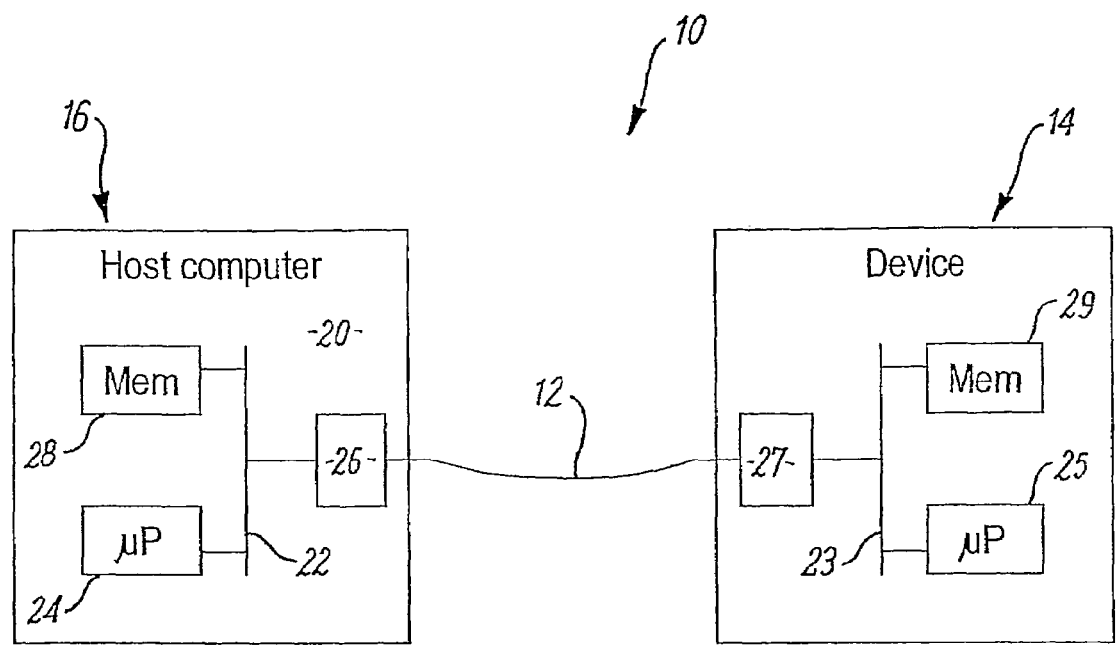
FIG. 1 is a schematic illustration of a USB system.

FIG. 1 illustrates a device 14 for attachment to a host 16 for serial communication comprising: means 27 for transferring to the host a predetermined data structure 46, 56 indicating whether or not the device supports direct memory access. It also illustrates a host 16 for attachment to a device 14 for serial data communication comprising: transfer means 26 for transferring, from the device 14 to the host 16, a predetermined data structure 46, 56 identifying whether or not the device supports direct memory access to the memory 29.

The Universal serial bus (USB) is a cable bus that supports data exchange between a host computer 20 and a wide range of simultaneously accessible peripherals 14. The attached peripherals 14 share USB bandwidth through a host-scheduled, token-base protocol. The bus 12 allows peripherals to be attached, configured, used and detached while the host and other peripherals are in operation.

FIG. 1 is a schematic illustration of a Universal serial bus (USB) system 10 comprising a USB interconnect 12 connecting a USB device 14 to a USB host 16. The USB host may be a computer 20 having a bus 22 connecting a processor 24 to a USB Host Controller 26 and a memory 28. The USB Host controller 26 connects the computer 20 to the USB interconnect 12.

In this example, the device 14 comprises an interface 27 which connects to the interconnect 12 a bus 23 that connects the interface 27 to a processor 25 and a memory 29. The interface may be able to access the memory 29 for reading or writing directly using direct memory access (DMA) or, alternatively, using the bus 23 which is under the control of the processor 25.

The USB system 10 transfers data in bit serial format between the USB host 16 and the USB device 14. There is only one host in a USB system and it is master of the bus. The USB is a polled bus and the Host initiates all data transfers which are either a read from or a write to an endpoint.

An endpoint is a source or sink of data. Each endpoint has a memory buffer which buffers the data before it proceeds to its ultimate destination. The host can sent data to the memory buffer or request data from the memory buffer.

Data transfer between a host 16 and a device 14, occurs between the host 16 and a data endpoint and is referred to as a pipe. The pipe determines the direction of data flow, the type of data flow e.g. bulk, isochronous or control, and how much bandwidth is allocated to the data transfer.

When the USB device 14 is initially connected to the system 10, bus enumeration occurs. This is the process by which the device is allocated an address and data is sent from the device to the host that identifies the capabilities of the device and enables communications between the host and device.

The USB host 16 communicates with a USB device 14 by sending packets to the USB device 14 addressed using the assigned address.

All USB devices must support a specially designated pipe at endpoint zero. Associated with endpoint zero is the information required to completely describe the device to the host on enumeration. This information includes device, configuration, interface and endpoint descriptors. The descriptors report the attributes of the USB device to the host.

A descriptor is a data structure with a defined format. Each descriptor begins with a byte-wide field that contains the total number of bytes in the descriptor followed by a byte-wide field that identifies the descriptor type.

A device descriptor uniquely identifies the device and informs the host of the number of configurations the device has.

A configuration descriptor informs the host of the devices different possible configurations e.g. self-powered and/or bus powered. It also informs the host of the number of interfaces it has.

Each interface is a grouping of endpoints into a functional group that performs a single feature of the device. For example, in a combined fax/scanner/printer device there would be one interface and one interface descriptor for each of the fax, scanner and printer functions. The fax interface descriptor specifies the inbound endpoint and outbound endpoint used for faxing. The scanner interface descriptor specifies the different endpoints used for scanning. The printer interface descriptor specifies the additional endpoints used for printing.

According to a first embodiment of the invention, a new non-standard DMA descriptor is defined. This descriptor is used to extend the interface descriptor and tells the host whether or not DMA is available on that interface. The DMA descriptor immediately follows the interface descriptor it extends, during the enumeration process.

Figure 2:
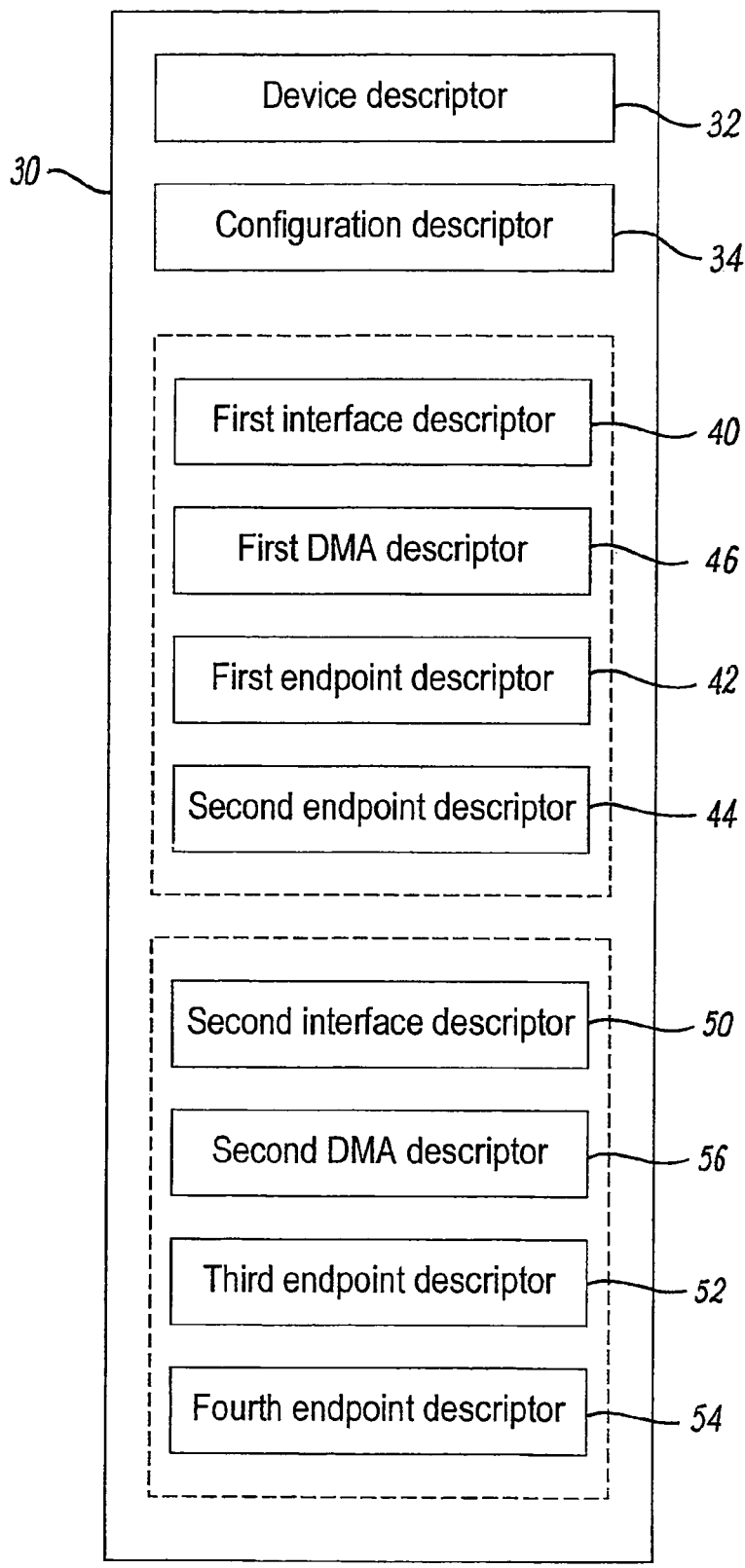
FIG. 2 illustrates the information transferred from the device to the host.

FIG. 2 illustrates the information transferred from the device to the host during the enumeration process and stored at endpoint zero of the device. The information 30, in the example illustrated, comprises a device descriptor 32, a configuration descriptor 34, a first interface descriptor 40 and a second interface descriptor 50, first and second endpoint descriptors 42 and 44 which are associated with the first interface and third and fourth interface descriptors 52 and 54 which are associated with the second interface. The first 42 and second 44 endpoint descriptors follow the descriptor 40 of the interface with which they are associated. The third 52 and fourth 54 endpoint descriptors follow the descriptor 50 of the interface with which they are associated. A first DMA descriptor 46 associated with the first interface immediately follows and extends the first interface descriptor 40. A second DMA descriptor 56 associated with the second interface immediately follows and extends the second interface descriptor 50.

A DMA descriptor is a data structure with a defined format. It begins with a byte-wide field that contains the total number of bytes in the descriptor followed by a byte-wide field that identifies the descriptor type.

The format of the descriptor is as follows:

| | |
|---|---|
| bFunctionLength | 0x04 |
| bDescriptorType | 0x24 |
| bDescriptorSubtype | 0xFD |
| bDMA available | 0x00/0x01 |

The value for bFunctionLength is determined by the Universal Serial Bus Specification. The value for the bDescriptorType is also defined by the Universal Serial Bus Specification and it identifies the Communication Device Class. The bDescriptorSubtype value is one of many defined values in the Communication Device Class which are free to use. It is used to identify the DMA descriptor. The value of bDMAavailable indicates whether or not DMA is supported by the interface (0x00 indicates no DMA, 0x01 indicates DMA is available).

The host uniquely identifies the received descriptor as a DMA descriptor from the bDescriptorType and bDescriptorSubtype fields.

In this embodiment, it is assumed that if an interface supports DMA then each of the endpoints associated with that endpoint also support DMA. The host determines which interfaces are capable of supporting DMA. The host has intelligence capable of assigning different data transfer tasks to different interfaces so that the transfer of data is optimised without overburdening the processor of the device.

According to an alternative embodiment, the DMA descriptor is used to extend an endpoint descriptor instead of an interface descriptor. In this embodiment an endpoint descriptor immediately follows the interface descriptor and the DMA descriptor associated with an endpoint immediately follows and extends its endpoint descriptor. Each endpoint descriptor preferably has an associated DMA descriptor. In this alternative embodiment, it is assumed that whether or not an endpoint of an interface supports DMA is independent of whether or not the other endpoints of the interface support DMA.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A device for attachment to a host for serial data communication comprising:
   a memory configured to store a predetermined data structure that indicates whether or not the device supports direct memory access; and
   an interface for enabling the transfer from the device to the host of the predetermined data structure.

2. A device as claimed in claim 1, wherein the interface is responsive to a request from the host.

3. A device as claimed in claim 1, wherein the predetermined data structure is one of a plurality of data structures transferred at one time to the host.

4. A device as claimed in claim 1, wherein the device is a USB device and the predetermined data structure is a descriptor.

5. A device as claimed in claim 4, wherein the descriptor is a non-standard descriptor.

6. A device as claimed in claim 4, wherein the predetermined data structure extends a preceding descriptor.

7. A device as claimed in claim 4, wherein the predetermined data structure is transferred during the device enumeration.

8. A host for attachment to a device for serial data communication comprising:
   a controller for receiving a data structure from the device, and a processor operable to identify a transferred data structure as a predetermined data structure, that indicates that the device supports direct memory access.

9. A host as claimed in claim 8, wherein the transfer means is arranged to request the device to send at least the predetermined data structure.

10. A host as claimed in claim 8, wherein the predetermined data structure is one of a plurality of data structures transferred at one time to the host.

11. A host as claimed in claim 8 wherein the host is a USB host and the predetermined data structure is a descriptor.

12. A host as claimed in claim 11, wherein the descriptor is a non-standard descriptor.

13. A host as claimed in claim 11, wherein the predetermined data structure extends a previously transferred descriptor.

14. A host as claimed in claim 8, where the processor is further operable to allocate tasks relating to data transfer from/to the device in dependence upon the content of the predetermined data structure.

15. A host as claimed in claim 11, wherein the predetermined data structure is transferred during the enumeration of the device by the host.

16. A system comprising a host, a device comprising a predetermined data structure, and a serial data interconnect between the host and device, the system further comprising:
   an interface for transferring, from the device to the host via the serial data interconnect, a predetermined data structure indicating whether or not the device supports direct memory access.

17. A system as claimed in claim 16 wherein the host is arranged to request the device to send at least the predetermined data structure.

18. A system as claimed in claim 16 wherein the device is arranged to transfer the predetermined data structure in response to a request from the host.

19. A system as claimed in claim 16 wherein the device is a USB device, the host is a USB host and the predetermined data structure is a descriptor.

20. A method of attaching a device to a host for serial data communication comprising:
   transferring from the device to the host, a predetermined data structure that indicates whether or not the device supports direct memory access.

21. A method as claimed in claim 19 wherein the device transfers the predetermined data structure to the host in response to a request from the host.

22. A method as claimed in claim 19 wherein the device is a USB device, the host is a USB host and the predetermined data structure is a descriptor.

* * * * *